United States Patent
Kim et al.

(10) Patent No.: US 8,982,078 B2
(45) Date of Patent: Mar. 17, 2015

(54) TOUCH SCREEN PANEL

(71) Applicant: Samsung Display Co., Ltd., Yongin (KR)

(72) Inventors: Hyung-Chul Kim, Yongin (KR); Jung-Mok Park, Yongin (KR)

(73) Assignee: Samsung Display Co., Ltd., Yongin (KR)

( * ) Notice: Subject to any disclaimer, the term of this patent is extended or adjusted under 35 U.S.C. 154(b) by 277 days.

(21) Appl. No.: 13/723,039

(22) Filed: Dec. 20, 2012

(65) Prior Publication Data
US 2014/0055383 A1 Feb. 27, 2014

(30) Foreign Application Priority Data

Aug. 27, 2012 (KR) ........................ 10-2012-0093579

(51) Int. Cl.
*G06F 3/041* (2006.01)
*G06F 3/044* (2006.01)

(52) U.S. Cl.
CPC .............. *G06F 3/041* (2013.01); *G06F 3/0418* (2013.01); *G06F 3/044* (2013.01)
USPC ........................................................ 345/173

(58) Field of Classification Search
USPC ................................................. 345/173, 174
See application file for complete search history.

(56) References Cited

U.S. PATENT DOCUMENTS

| 2010/0134436 | A1* | 6/2010 | Jeong et al. | 345/174 |
|---|---|---|---|---|
| 2010/0182256 | A1* | 7/2010 | Jeong et al. | 345/173 |
| 2010/0182259 | A1* | 7/2010 | Jung et al. | 345/173 |
| 2010/0182272 | A1* | 7/2010 | Kang et al. | 345/174 |
| 2010/0182281 | A1* | 7/2010 | Lee et al. | 345/175 |
| 2011/0007005 | A1* | 1/2011 | Lee et al. | 345/173 |
| 2011/0279390 | A1* | 11/2011 | Park et al. | 345/173 |
| 2012/0098762 | A1* | 4/2012 | Kim et al. | 345/173 |

FOREIGN PATENT DOCUMENTS

| KR | 10-2011-0041109 A | 4/2011 |
|---|---|---|
| KR | 10-2012-0043406 A | 5/2012 |

* cited by examiner

*Primary Examiner* — Jonathan Boyd
(74) *Attorney, Agent, or Firm* — Knobbe Martens Olson & Bear, LLP

(57) ABSTRACT

A touch screen panel includes a transparent substrate, a first sensing electrodes, a second sensing electrodes, a plurality of first connectors, each of which connects two neighboring first sensing electrodes, and a plurality of second connectors, each of which connects two neighboring second sensing electrodes. The touch screen panel further includes a electrostatic induction member formed over a touch inactive region, the electrostatic induction member being electrically coupled to one of the first sensing electrodes and extending toward one of the second sensing electrodes adjacent to the one of the first sensing electrodes, at least a portion of the electrostatic induction member overlapping the adjacent second sensing electrode when viewing in the thickness direction. A first insulation layer is interposed between the first connectors and the second connectors and between the electrostatic induction member and the adjacent sensing electrode.

13 Claims, 4 Drawing Sheets

TOUCH SCREEN PANEL

CROSS-REFERENCE TO RELATED APPLICATION

This application claims priority to and the benefit of Korean Patent Application No. 10-2012-0093579, filed on Aug. 27, 2012, in the Korean Intellectual Property Office, the entire content of which is incorporated herein by reference.

BACKGROUND

1. Field

The present disclosure relates to a touch screen panel, and more particularly, to a touch screen panel capable of preventing driving defect from being generated by static electricity.

2. Description of the Related Technology

A touch screen panel is an input device capable of selecting the indication content displayed on the screen of an image display device by a human hand or an object to input the command of a user.

Therefore, the touch screen panel is provided on the entire surface of the image display device to convert a contact position of the human hand or the object into an electrical signal. Therefore, the instruction contact selected in the contact position is received as an input signal.

Since the touch screen panel may replace an additional input device coupled to the image display device to operate such as a keyboard and a mouse, the use range is gradually increasing.

Methods of realizing a touch screen panel include a resistance layer method, a photo-sensing method, and an electro-capacitive method.

Among the above methods, the widely used electro-capacitive touch screen panel detects a change in capacitance formed by conductive sensing electrodes together with other peripheral sensing electrodes or a ground electrode when the human hands or the object contacts the touch screen panel to convert the contact position into the electrical signal.

Here, in order to correctly determine the contact position in a contact surface, the sensing electrodes include first sensing electrodes formed to be coupled in a first direction by first connectors and second sensing electrodes formed to be coupled in a second direction by second connectors.

In general, the first connectors and the second connectors intersect each other while being insulated from each other with an insulating layer interposed. The width of the first connectors and the second connectors is smaller than the width of the sensing electrodes so that resistance is relatively large. Therefore, intersections between the first connectors and the second connectors may be damaged by static electricity.

When damage such as insulation destruction or short circuit may be generated in the intersections of the first connectors and the second connectors by static electricity, the driving defect of the touch screen panel is caused.

SUMMARY

Accordingly, one aspect of the present invention has been made to provide a touch screen panel capable of preventing driving defect from being generated by static electricity.

One aspect of the present invention provides a touch screen panel, including a transparent substrate having a touch active region and a touch inactive region located outside the touch active region when viewing in a thickness direction of the transparent substrate, a plurality of first sensing electrodes formed over the transparent substrate, a plurality of second sensing electrodes arranged between the first sensing electrodes, a plurality of first connectors, each of which connects two neighboring first sensing electrodes among the first sensing electrodes, the two neighboring first sensing electrodes being arranged in a first direction, a plurality of second connectors, each of which connects two neighboring second sensing electrodes among the second sensing electrodes, the two neighboring second sensing electrodes being arranged in a second direction which is different from the first direction, an electrostatic induction member formed over the touch inactive region, the electrostatic induction member being electrically coupled to one of the first sensing electrodes and extending toward one of the second sensing electrodes adjacent to the one of the first sensing electrodes coupled to the electrostatic induction members so that at least a portion of the electrostatic induction member overlaps the adjacent second sensing electrode when viewing in the thickness direction, and a first insulating layer interposed between the first connectors and the second connectors and interposed between the electrostatic induction member and the adjacent second sensing electrode.

The touch screen panel further comprising a second electrostatic induction member formed over the touch inactive region, the second electrostatic induction member being electrically coupled to one of the second sensing electrodes and extending toward one of the first sensing electrodes adjacent to the one of the second sensing electrodes so that at least a portion of the second electrostatic induction member overlaps the adjacent first sensing electrode when viewed in the thickness direction.

The electrostatic induction member and the second electrostatic induction member extend substantially parallel with each other and are arranged to be adjacent to each other.

The touch screen panel further comprises one or more additional electrostatic induction members, the electrostatic induction members are arranged side by side.

The electrostatic induction member is positioned at a corner of the transparent substrate.

Each of the first connectors is located at a level different from the level of the two neighboring first sensing electrodes while electrically connecting the two neighboring first sensing electrodes.

The electrostatic induction member has a width greater than that of the first connectors.

The electrostatic induction member is arranged in the same level with that of the first connectors and is formed of the same material as the first connectors.

Each of the first connectors is electrically coupled to the corresponding first sensing electrode through a contact hole formed in the first insulating layer.

The plurality of first and second sensing electrodes comprise peripheral sensing electrodes, each of which is positioned over both the touch active region and the touch inactive region.

The touch screen panel further includes outside wiring lines for coupling the first sensing electrodes and the second sensing electrodes to an external driving circuit.

The first and second sensing electrodes and the second connectors are formed of a transparent electrode material. The first connectors and the electrostatic induction member are formed of an opaque metal material.

The transparent substrate is set as an upper substrate of a display panel and integrated with the display panel.

As described above, according to embodiments of the present invention, the electrostatic induction members are formed to be electrically coupled to the first sensing electrodes and the second sensing electrodes and to be extended toward adjacent sensing electrodes so that partial regions overlap the adjacent sensing electrodes. Therefore, it is possible to prevent the driving defect of the touch screen panel from being generated by static electricity.

In addition, the electrostatic induction members are formed in the touch inactive region so that it is possible to prevent the electrostatic induction members positioned in the touch active region from being visible.

In addition, the size of the electrostatic induction members positioned in the touch inactive region is increased so that electrostatic inducing effect may be improved.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
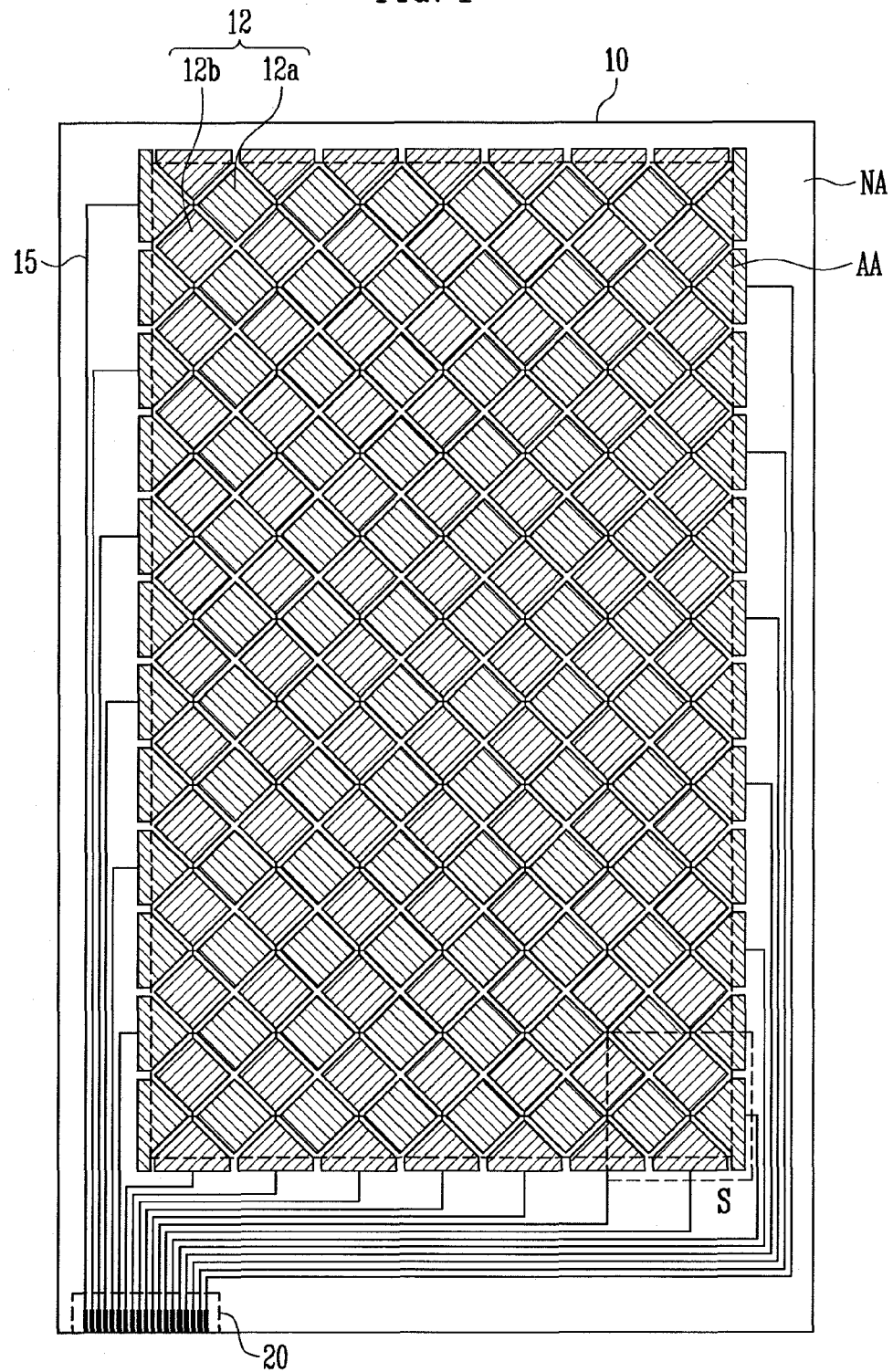
FIG. 1 is a plan view schematically illustrating an example of a touch screen panel.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the element or be indirectly on the element with one or more intervening elements interposed therebetween. Also, when an element is referred to as being "connected to" another element, it can be directly connected to the element or be indirectly connected to the element with one or more intervening elements interposed therebetween. Hereinafter, like reference numerals refer to like elements.

Hereinafter, the embodiments of the present invention will be described in detail with reference to the accompanying drawings.

FIG. 1 is a plan view schematically illustrating an example of a touch screen panel.

Referring to FIG. 1, the touch screen panel includes a transparent substrate 10, and a touch active region AA and touch inactive region NA when viewing in a thickness direction of the substrate 10. The touch screen panel includes sensing electrodes 12 formed in a touch active region AA on the transparent substrate 10, and outside wiring lines 15 formed in a touch inactive region NA outside the touch active region AA to couple the sensing electrodes 12 to an external driving circuit (not shown) through a pad unit 20.

The touch active region or touch active region AA overlaps an image display region of a display panel (not shown) provided below the touch screen panel to be visible. The touch inactive region NA overlaps a non-display region not to be visible due to a frame for covering the non-display region or a light shielding layer for shielding light.

The sensing electrodes 12 are dispersed in the touch active region AA formed on the transparent substrate 10 and include a plurality of first sensing electrodes 12a formed to be electrically coupled in a first direction and a plurality of second sensing electrodes 12b dispersed between the first sensing electrodes 12a not to overlap the first sensing electrodes 12a and electrically coupled in a second direction that intersects the first direction.

That is, the first sensing electrodes 12a and the second sensing electrodes 12b are alternately arranged to be coupled in different directions. For example, the first sensing electrodes 12a are coupled in a row direction (a horizontal direction) and coupled to the outside wiring lines 15 and the second sensing electrodes 12b are coupled in a column direction (a vertical direction) and coupled to the outside wiring lines 15.

The first sensing electrodes 12a and the second sensing electrodes 12b may be formed of a transparent electrode material such as indium tin oxide (ITO) to transmit light from a display panel (not shown) provided below the touch screen panel.

In addition, the ends of the sensing electrodes 12 positioned outside the touch active region AA may be extended to the touch inactive region NA by a predetermined length. The extended ends of the sensing electrodes 12 are coupled to the outside wiring lines 15. The length and shape of the extended ends may vary.

On the other hand, although illustrated by simple lines without using reference numerals in FIG. 1, in the touch active region AA on the transparent substrate 10, a plurality of connectors arranged in the first direction to couple the first sensing electrodes 12a in the first direction (for example, a row direction) and a plurality of second connectors arranged in the second direction to couple the second sensing electrodes 12b in the second direction (for example, a column direction) are further formed. An embodiment of the connectors and detailed description thereof will be described later.

The outside wiring lines 15 for coupling the first sensing electrodes 12a and the second sensing electrodes 12b to an external driving circuit are electrically coupled to the first sensing electrodes 12a in row lines and the second sensing electrodes 12b in column lines to couple the first sensing electrodes 12a and the second sensing electrodes 12b to an external driving circuit such as a position detecting circuit through the pad unit 20.

The outside wiring lines 15 arranged in the touch inactive region NA outside the touch screen panel to avoid the touch active region AA have a wide choice of selecting materials and may be formed of low resistance materials such as Mo, Ag, Ti, Cu, Al, and Mo/Al/Mo other than a transparent electrode material used for forming the sensing electrodes 12.

In the above-described electro-capacitive touch screen panel, when a contact object such as a human hand or a stylus pen contacts the touch screen panel, a change in capacitance in accordance with a contact position is transmitted from the sensing electrodes 12 to the driving circuit via the outside wiring lines 15 and the pad unit 20. Then, the change in the capacitance is converted into an electrical signal by an X and Y input processing circuit (not shown) so that the contact position is grasped.

Figure 2:
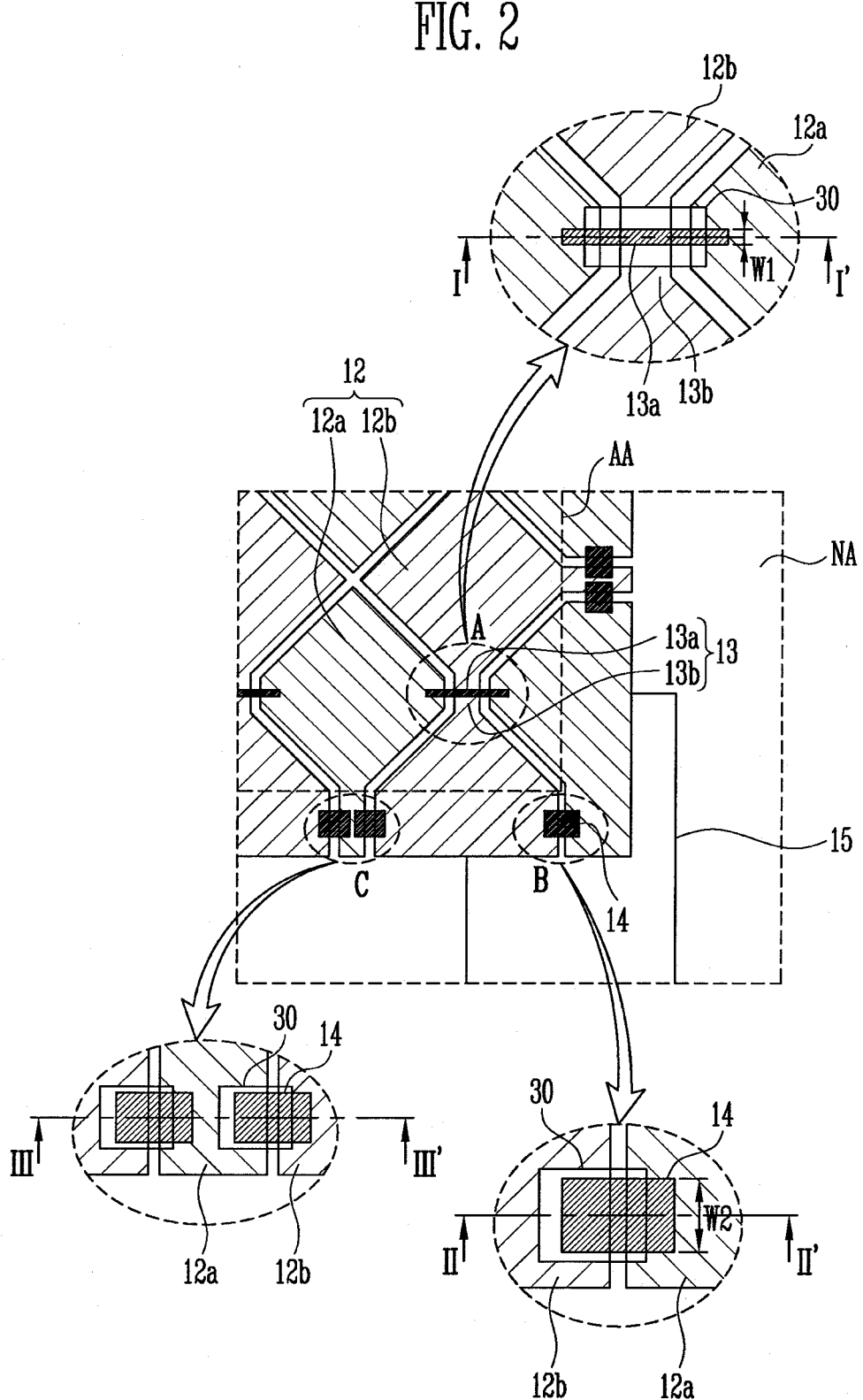
FIG. 2 is a plan view and a partially enlarged view illustrating sensing electrodes, connectors, and electrostatic induction members of a touch screen panel according to a partial embodiment of the present invention.
Figure 3A:
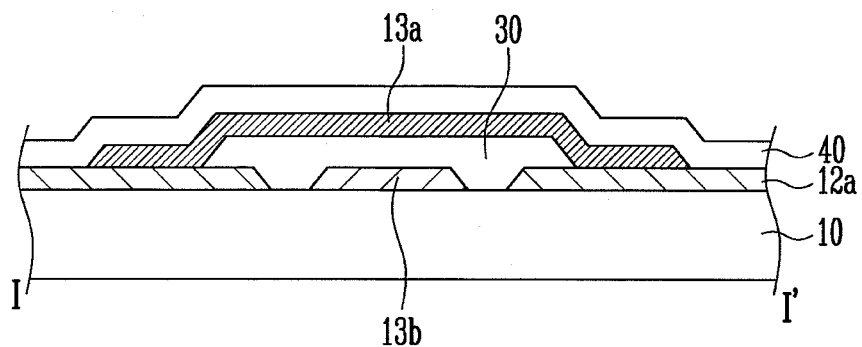
FIGS. 3A to 3C are sectional views illustrating main parts of the touch screen panel taken along the lines I-I', II-II', and III-III'.
Figure 3B:
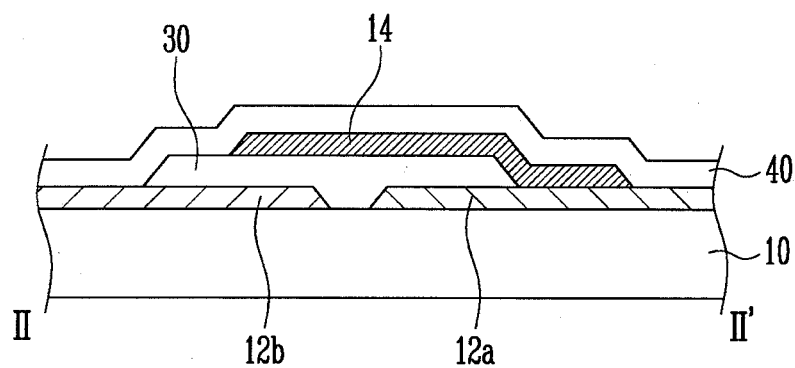
Figure 3C:
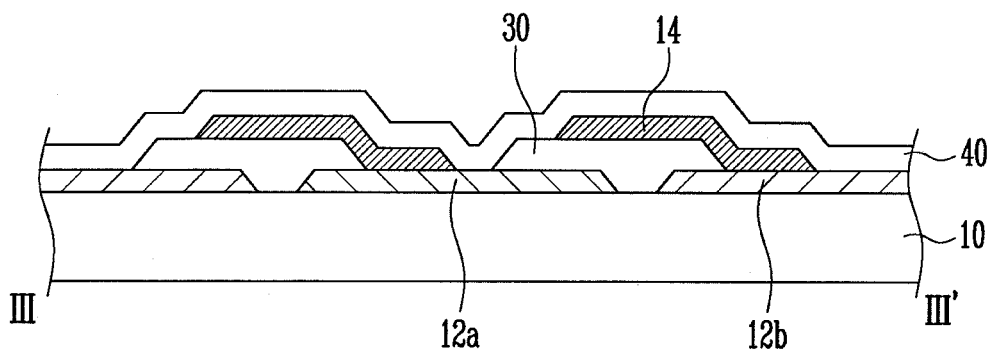

FIG. 2 is a plan view and a partially enlarged view illustrating sensing electrodes, connectors, and electrostatic induction members of a touch screen panel according to a partial embodiment of the present invention. FIGS. 3A to 3C are sectional views illustrating main parts of the touch screen panel taken along the lines I-I', II-II', and III-III'.

For convenience sake, in FIG. 2, a partial region S of the transparent substrate 10 illustrated in FIG. 1 is enlarged. However, a real touch screen panel has a structure in which the structure illustrated in FIG. 2 is repeatedly provided on the transparent substrate 10.

Referring to the region A of FIG. 2 and FIG. 3A, the touch screen panel according to a partial embodiment of the present invention includes a transparent substrate 10, a plurality of first sensing electrodes 12a and second sensing electrodes 12b formed in the touch active region AA formed on the transparent substrate 10 to be electrically coupled in a first direction and a second direction, a plurality of first connectors 13a for electrically coupling the first sensing electrodes 12a in the first direction and a plurality of second connectors 13b for coupling the second sensing electrodes 12b in the second direction, and a first insulating layer 30 interposed between the first connectors 13a and the second connectors 13b to secure insulation property.

In the partial embodiment, the first insulating layer 30 may be partially provided between the first connectors 13a and the second connectors 13b in which insulation property is to be secured. In another embodiment, the first insulating layer 30 may be entirely formed in the touch activation region AA where the sensing electrodes 12 are formed.

In addition, in accordance with a design structure, in order to protect the patterns formed on the transparent substrate 10, a second insulating layer 40 may be further entirely formed on the touch screen panel.

Here, since the touch active region AA is realized to be transparent so that an image from a display panel may be visible, the first and second sensing electrodes 12a and 12b are formed of the transparent electrode material such as the ITO and the first and/or second connectors 13a and 13b may be formed of the same transparent electrode material as the first and second sensing electrodes 12a and 12b or an opaque low resistance metal material. The width, thickness, or length of the first and/or second connectors 13a and 13b may be controlled to prevent the first and/or second connectors 13a and 13b from being visible.

For example, the first connectors 13a may be formed of a low resistance opaque metal material. And, the second connectors 13b may be formed of the transparent electrode material together with the first and second sensing electrodes 12a and 12b. In this case, the first sensing electrodes 12a are formed to have separated patterns between the second sensing electrodes 12b and may be coupled by the first connectors 13a in the first direction.

In the partial embodiment, the first insulating layer 30 is locally formed in a region where the insulation property is to be secured, for example, in the intersections of the first connectors 13a and the second connectors 13b and the first sensing electrodes 12a and the first connectors 13a may be coupled to each other by direct contact. In this case, contact resistance may be determined in accordance with the size of the contact area of the first sensing electrodes 12a and the first connectors 13a.

In another embodiment, the first connectors 13a are separately patterned to the upper or lower layer of the first sensing electrodes 12a coupled by the first connectors 13a and the both ends of the first connectors 13a may be electrically coupled to the adjacent first sensing electrodes 12a through a contact hole (not shown) formed in the first insulting layer 30.

At least one contact hole is formed to couple one first sensing electrode 12a to one first connector 13a. At least two contact holes may be formed to reduce the contact resistance. The number of contact holes may be controlled in consideration of the contact resistance and visibility.

On the other hand, when the second connectors 13b are formed of the transparent electrode material, the second sensing electrodes 12b and the second connectors 13b are integrally patterned in the second direction from a process of patterning the transparent electrode material to simplify processes.

When the first connectors 13a are formed of the low resistance opaque metal material, in forming electrostatic inductive electrodes 14 and the outside wiring lines 15 arranged in the touch inactive region NA, the first connectors 13a, the electrostatic inductive electrodes 14, and the outside wiring lines 15 are simultaneously formed so that the processes may be simplified. That is, the first connectors 13a may be formed of the same material as the electrostatic inductive electrodes 14 and the outside wiring lines 15 in the same layer.

When the first connectors 13a are formed of the low resistance opaque metal material, the width of the first connectors 13a is limited so that it is possible to prevent the first connectors 13a from being visible. Therefore, the width of the first connectors 13a is formed to be smaller than the width of the second connectors 13b formed of the transparent electrode material. In the partial embodiment, the first connectors 13a may be designed to be obliquely inclined so that it is possible to effectively prevent the first connectors 13a from being visible.

As described above, since the first connectors 13a are positioned in the touch active region AA that overlaps an image display surface to be exposed to the outside, the first connectors 13a are to be narrowly designed in consideration of visibility. In this case, due to static electricity concentrated on the intersections of the first and second connectors 13a and 13b, defect is easily generated in the first connectors 13a so that the driving defect of the touch screen panel may be caused.

Therefore, the present invention is for preventing the driving defect of the touch screen panel from being generated by static electricity. Referring to the region B of FIG. 2 and FIG. 3B, in the touch inactive region NA, the plurality of electrostatic induction members 14 are formed to be electrically coupled to the first sensing electrodes 12a or the second sensing electrodes 12b and to be extended toward the sensing electrodes 12b adjacent to the sensing electrodes 12a coupled to the electrostatic induction members 14 so that partial regions overlap the adjacent sensing electrodes 12b.

In particular, the electrostatic induction members 14 are formed in the touch inactive region NA so that it is possible to prevent the electrostatic induction members from being visible by being positioned in the touch active region AA. The size of the electrostatic induction members 14 positioned in the touch inactive region NA is properly increased without considering visibility so that the electrostatic inducing effect may be increased.

The width W2 of the electrostatic induction members 14 may be larger than the width W1 of the first connectors 13a. In order to maximize the electrostatic inducing effect, the width W2 of the electrostatic induction members 14 may be maximal.

The ends of the sensing electrodes 12 positioned outside the touch active region AA may be extended to the touch inactive region NA by a predetermined length so that the electrostatic induction members 14 may be easily patterned in the touch inactive region NA. The extended ends of the sensing electrodes 12 may be coupled to the outside wiring lines 15.

The first insulating layer 30 for securing the insulation property is interposed between the electrostatic induction members 14 and the first sensing electrodes 12a.

The electrostatic induction members 14 may be formed of the same material as the first connectors 13a in the same layer in order to simplify the processes. In addition, the electrostatic induction members 14 may be formed of the low resistance opaque metal material like the first connectors 13a and the outside wiring lines 15.

In the partial embodiment, one end of each of the electrostatic induction members 14 may be coupled to each of the first sensing electrodes 12a through direct contact. In this case, contact resistance may be determined in accordance with the size of the contact area between one end of each of the electrostatic induction members 14 and each of the first sensing electrodes 12a.

In another embodiment, the electrostatic induction members 14 are separately patterned in the upper or lower layer of the sensing electrodes 12 coupled to the electrostatic induction members 14 so that one end of each of the electrostatic induction members 14 may be electrically coupled to each of the first sensing electrodes 12a through a contact hole formed in the first insulating layer 30.

On the other hand, the electrostatic induction members 14 may be entirely formed around the transparent substrate 10 as illustrated in the region C of FIG. 2 as well as at the corner of the transparent substrate 10 as illustrated in the region B of FIG. 2.

Referring to the region C of FIG. 2 and FIG. 3C, the plurality of electrostatic induction members 14 are arranged between the first and second sensing electrodes 12a and 12b in the touch inactive region NA so that one electrostatic induction member 14 is electrically coupled to the first sensing electrodes 12a and overlaps the adjacent second sensing electrode 12b and that another electrostatic induction member 14 is electrically coupled to the second sensing electrodes 12b and overlaps the adjacent first sensing electrode 12a.

When electrostatic capacity is induced to the electrostatic induction members 14, stability may be secured for the first and second connectors 13a and 13b and, although damage such as short circuit is applied to the electrostatic induction members 14, the damage does not affect driving of the touch screen panel.

As described above, according to the present invention, in the touch inactive region NA, the plurality of electrostatic induction members 14 are formed to be electrically coupled to the first sensing electrodes 12a or the second sensing electrodes 12b and to be extended toward the sensing electrodes 12b adjacent to the sensing electrodes 12 coupled to the electrostatic induction members 14 so that partial regions overlap the adjacent sensing electrodes 12b. Therefore, it is possible to prevent the driving defect of the touch screen panel from being generated by static electricity.

In addition, the electrostatic induction members 14 are formed in the touch inactive region NA so that it is possible to prevent the electrostatic induction members positioned in the touch active region AA from being visible. The size of the electrostatic induction members 14 positioned in the touch inactive region NA is increased so that the electrostatic inducting effect may be improved.

Figure 4:
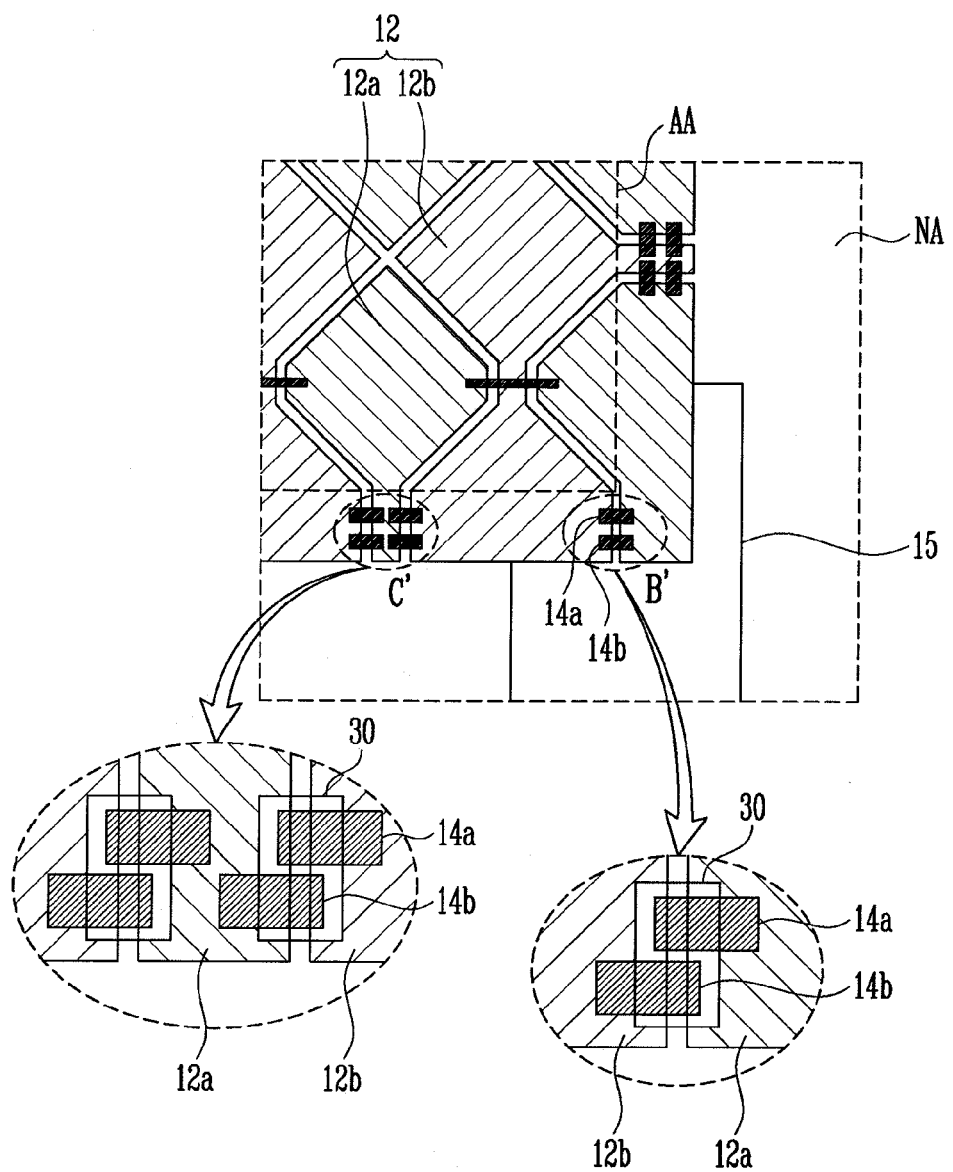
FIG. 4 is a plan view illustrating modifications of the electrostatic induction members of FIG. 2.

FIG. 4 is a plan view illustrating modifications of the electrostatic induction members of FIG. 2. The above description may be referred to for the elements denoted by the same reference numerals as the above-described elements if not contradictory and redundant description of the elements will be omitted.

Referring to FIG. 4, the electrostatic induction members 14 may include a plurality of separate induction members 14a and 14b.

The electrostatic induction members 14 according to the present embodiment may include the first electrostatic induction members 14a coupled to the first sensing electrodes 12a and having partial regions overlap the adjacent second sensing electrodes 12b and the second electrostatic induction members 14b coupled to the second sensing electrodes 12b and having partial regions overlap the first sensing electrodes 12a. In embodiments, the first electrostatic induction members 14a and the second electrostatic induction members 14b are extended to run parallel with each other and may be arranged to be adjacent to each other.

That is, the first electrostatic induction members 14a and the second electrostatic induction members 14b are extended in opposite directions. For example, the first electrostatic induction members 14a are extended from right to left and the second electrostatic induction members 14b are arranged above or below the first electrostatic induction members 14a to be adjacent to the first electrostatic induction members 14a and may be extended from left to right while running parallel with the direction in which the first electrostatic induction members 14a are extended.

The number and shape of first and second electrostatic induction members 14a and 14b and the direction in which the first and second electrostatic induction members 14a and 14b are extended may vary.

According to the present embodiment, since static electricity induced to the touch screen panel may be induced in different directions by the first electrostatic induction members 14a and the second electrostatic induction members 14b, the electrostatic inducing effect may be improved.

The touch screen panel according to the present invention may be usefully applied to a structure in which the touch sensing patterns such as the first and second sensing electrodes 12a and 12b and the first and second connectors 13a and 13b are directly formed on the display panel to integrate the touch screen panel with the display panel.

More specifically, it is possible to provide a display panel integrated with a touch screen panel in which the transparent substrate 10 of the touch screen panel is set as the upper substrate of the display panel and the touch sensing patterns such as the first and second sensing electrodes 12a and 12b and the first and second connectors 13a and 13b are formed on one surface of the upper substrate of the display pattern. In this case, the thickness of the first insulating layer 30 between the first and second connectors 13a and 13b may be limited.

For example, in the case where the display panel is set as an organic light emitting display panel in which upper and lower substrates are sealed up by frit, when the first insulating layer 30 is formed of a thick organic insulating layer, the organic insulating layer may be broken due to a high frit annealing temperature. The organic insulating layer may be replaced by an inorganic insulating layer.

That is, when the transparent substrate 10 as the member of the touch screen panel is set as the upper substrate of the display panel so that the touch screen panel is integrated with the display panel, the first insulating layer 30 may be designed by an inorganic insulating layer entirely formed in the touch active region AA where the first and second sensing electrodes 12a and 12b and the first and second connectors 13a and 13b are formed. The thickness of the inorganic insulating layer is limited in comparison with the organic insulating layer due to layer stress.

Therefore, the thickness of the first insulating layer 30 formed of the inorganic insulating layer is limited so that the first insulating layer 30 may be vulnerable to static electricity. However, according to embodiments of the present invention, when the electrostatic induction members 14 are formed, vulnerability to static electricity is improved. Therefore, the touch screen panel according to the present invention may be usefully applied to the structure in which the touch screen panel is integrated with the display panel.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel, comprising:
a transparent substrate comprising a touch active region and a touch inactive region located outside the touch active region when viewing in a thickness direction of the transparent substrate;
a plurality of first sensing electrodes formed over the transparent substrate;
a plurality of second sensing electrodes arranged between the first sensing electrodes;
a plurality of first connectors, each of which connects two neighboring first sensing electrodes among the plurality of first sensing electrodes, the two neighboring first sensing electrodes being arranged in a first direction;
a plurality of second connectors, each of which connects two neighboring second sensing electrodes among the plurality of second sensing electrodes, the two neighboring second sensing electrodes being arranged in a second direction which is different from the first direction;
an electrostatic induction member formed over the touch inactive region, the electrostatic induction member being electrically coupled to one of the first sensing electrodes and extending toward one of the second sensing electrodes adjacent to the one of the first sensing electrodes, at least a portion of the electrostatic induction member overlapping the adjacent second sensing electrode when viewing in the thickness direction; and
a first insulation layer interposed between the first connectors and the second connectors and interposed between the electrostatic induction member and the adjacent second sensing electrode.

2. The touch screen panel as claimed in claim 1, further comprising a second electrostatic induction member formed over the touch inactive region, the second electrostatic induction member being electrically coupled to one of the second sensing electrodes and extending toward one of the first sensing electrodes adjacent to the one of the second sensing electrodes so that at least a portion of the second electrostatic induction member overlaps the adjacent first sensing electrode when viewed in the thickness direction.

3. The touch screen panel as claimed in claim 2, wherein the electrostatic induction member and the second electrostatic induction member extend substantially parallel with each other and are arranged to be adjacent to each other.

4. The touch screen panel as claimed in claim 1, further comprising one or more additional electrostatic induction members, the electrostatic induction members are arranged side by side.

5. The touch screen panel as claimed in claim 1, wherein the electrostatic induction member is positioned at a corner of the transparent substrate.

6. The touch screen panel as claimed in claim 1, wherein each of the first connectors is located at a level different from the level of the two neighboring first sensing electrodes while electrically connecting the two neighboring first sensing electrodes.

7. The touch screen panel as claimed in claim 6, wherein the electrostatic induction member has a width greater than that of the first connectors.

8. The touch screen panel as claimed in claim 6, wherein the electrostatic induction member is arranged in the same level with that of the first connectors and is formed of the same material as the first connectors.

9. The touch screen panel as claimed in claim 6, wherein each of the first connectors are electrically coupled to the corresponding first sensing electrode through a contact hole formed in the first insulation layer.

10. The touch screen panel as claimed in claim 1, wherein the plurality of first and second sensing electrodes comprise peripheral sensing electrodes, each of which is positioned over both the touch active region and the touch inactive region.

11. The touch screen panel as claimed in claim 1, further comprising outside wiring lines for coupling the first sensing electrodes and the second sensing electrodes to an external driving circuit.

12. The touch screen panel as claimed in claim 1,
wherein the first and second sensing electrodes and the second connectors are formed of a transparent electrode material, and
wherein the first connectors and the electrostatic induction member are formed of an opaque metal material.

13. The touch screen panel as claimed in claim 1, wherein the transparent substrate is set as an upper substrate of a display panel and integrated with the display panel.

* * * * *